(12) United States Patent
McAuliffe et al.

(10) Patent No.: US 10,371,198 B2
(45) Date of Patent: Aug. 6, 2019

(54) QUAD FOIL JOURNAL AIR BEARING

(71) Applicant: Hamilton Sundstrand Corporation, Charlotte, NC (US)

(72) Inventors: Christopher McAuliffe, Windsor, CT (US); Ronald M. Struziak, Longmeadow, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/962,627

(22) Filed: Apr. 25, 2018

(65) Prior Publication Data

US 2018/0298941 A1    Oct. 18, 2018

Related U.S. Application Data

(63) Continuation-in-part of application No. 14/599,732, filed on Jan. 19, 2015, now abandoned.

(51) Int. Cl.
*F16C 17/02* (2006.01)

(52) U.S. Cl.
CPC ........ *F16C 17/024* (2013.01); *F16C 2326/43* (2013.01); *F16C 2362/52* (2013.01)

(58) Field of Classification Search
CPC ...... F16C 17/024; F16C 17/042; F16C 17/10; F16C 33/108; F16C 33/1005; F16C 2326/43; F16C 2362/52
See application file for complete search history.

(56) References Cited

U.S. PATENT DOCUMENTS

| 4,465,384 | A | 8/1984 | Heshmat et al. |
| 4,818,123 | A | 4/1989 | Gu |
| 5,634,723 | A | 6/1997 | Agrawal |
| 7,070,330 | B2 | 7/2006 | Agrawal |
| 8,029,194 | B2 | 10/2011 | Agrawal et al. |
| 8,419,283 | B2 | 4/2013 | McAuliffe et al. |
| 8,801,290 | B2 | 8/2014 | Heshmat |
| 8,807,921 | B2 | 8/2014 | Struziak |
| 9,028,149 | B2 | 5/2015 | Rosen et al. |
| 9,109,622 | B2 | 8/2015 | Meacham et al. |
| 9,151,322 | B2 | 10/2015 | Heshmat |
| 9,376,959 | B2 | 6/2016 | Yoshino et al. |
| 2002/0097927 | A1 | 7/2002 | Lee et al. |
| 2011/0033142 | A1 | 2/2011 | Kim et al. |
| 2016/0091015 | A1 | 3/2016 | McAuliffe et al. |

FOREIGN PATENT DOCUMENTS

| EP | 2733371 A1 | 5/2014 |
| FR | 2700821 A1 | 7/1994 |

OTHER PUBLICATIONS

Extended European Search Report for corresponding EP Application No. 161518212-1751, dated Jun. 8, 2016, pp. 1-8.

*Primary Examiner* — Alan B Waits
(74) *Attorney, Agent, or Firm* — Cantor Colburn LLP (57) ABSTRACT

A quad foil journal air bearing includes a journal sleeve having an inner circumference that defines an inner surface. A first foil assembly includes a first key coupled to the inner surface of the journal sleeve. The quad foil journal air bearing further includes a second foil assembly having a second key coupled to the inner surface of the journal sleeve.

15 Claims, 9 Drawing Sheets

Front Cross-section

FIG. 2A

Rear Cross-section
FIG. 3A

QUAD FOIL JOURNAL AIR BEARING

CROSS REFERENCE TO RELATED APPLICATIONS

This Application is a continuation-in-part of U.S. patent application Ser. No. 14/599,732, filed on Jan. 19, 2015, now published as U.S. Patent Application Publication No. 2016/0208847, the contents of which is incorporated by reference herein in its entirety.

BACKGROUND OF INVENTION

This invention relates, generally, to rotary bearings, and more specifically, to an air journal bearing configured to facilitate rotation of rotating machinery.

Conventional journal air bearings typically support a rotatable component, such as a shaft disposed within a rotating machine such as, for example, an air-cycle machine of an aircraft. The shaft can realize to internal or external radial loads, which in turn is transferred to the journal air bearing. The radial load can overload the journal air bearing, which can ultimately cease the bearing and result in failure of the rotating machine. Therefore, it is desirable to provide an air journal bearing having an increased load capacity that can withstand loads applied over a wide range of radial angles.

BRIEF DESCRIPTION OF INVENTION

According to a non-limiting embodiment of the invention, a quad foil journal air bearing includes a journal sleeve having an inner circumference that defines an inner surface. A first foil assembly includes a first key coupled to the inner surface of the journal sleeve. The quad foil journal air bearing further includes a second foil assembly having a second key coupled to the inner surface of the journal sleeve.

According to another non-limiting embodiment of the invention, a rotating component comprises a rotatable shaft, and a quad foil journal air bearing configured to rotate the shaft. The quad foil journal air bearing includes a journal sleeve, a first foil assembly and a second foil assembly. The journal sleeve is disposed adjacent an outer surface of the shaft and defines a foil chamber therebetween. The first foil assembly is disposed in the foil chamber and includes a first key coupled to the inner surface of the journal sleeve. The second foil assembly is disposed in the foil chamber and includes a second key coupled to the inner surface of the journal sleeve.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

A quad foil air journal bearing according to various non-limiting embodiments includes dual double-wrapped foil assemblies configured to sustain radial loads from a wide range of radial angles. Each foil assembly includes a top foil, an intermediate foil, and a bump foil. The foil assemblies are received within a journal sleeve and are wrapped around the component. The top foil is disposed closer to the component than is each of the other foils. The bearing uses a fluid, such as air, to support the component during its rotation. There is little or no contact between the top foil and component when it rotates. Each foil assembly also includes a key that extends radially relative to an axis of rotation of the component. The keys are received within a respective key slot or keyway defined in the sleeve. Each key is configured to contact edges defined by the respective slot to limit rotation of the respective foil assembly relative to the component.

Conventional air journal bearings typically provide an asymmetrical stiffness within the bearing. For example, a conventional air journal bearing typically has a lower stiffness at one portion of the bearing and a higher stiffness at a second portion of the bearing opposite the first portion. Unlike the conventional air journal bearing, the dual double-wrapped foil assemblies provided by at least one non-limiting embodiment of the invention form a quad foil air journal bearing a substantially improved uniform stiffness within the bearing. In this manner, the quad foil air journal bearing has an increased load capacity that can withstand loads applied over a wide range of radial angles.

Referring now to FIGS. 1-4, a non-limiting exemplary embodiment of a quad foil air journal bearing (hereinafter referred to as a quad foil bearing) is generally indicated at 5. The quad foil bearing 5 has an outer diameter (d1) and an inner diameter (d2) that is less than the outer diameter (d2) (see FIG. 1A). Although the quad foil bearing 5 is disclosed herein as being implemented with rotating machinery such as, for example, as a shaft, disposed within an air-cycle machine of an aircraft, it should be appreciated that the bearing can be implemented with other aircraft accessories including, but not limited to, turbo-compressors, cabin air compressors, and ram air fans. The quad foil bearing 5 includes a first side 10a (e.g., a front side 10a), and a second side (e.g., a rear side 10b). A width (w) quad foil bearing 5 is defined as a distance between the first side 10a and the second side 10b.

The quad foil bearing 5 includes a first foil assembly 11a and a second foil assembly 11b. The first foil assembly 11a and the second foil assembly 11b have the same diameter and are disposed next to one another along the width (w) of the quad foil bearing 5 (see FIG. 1B). Each foil assembly 11a-11b includes a top foil 12a-12b, an intermediate foil 14a-14b, and a bump foil 16a-16b, and rotatably supports a rotatable component such as, for example, a shaft 18 of an air-cycle machine 20. Each of the top foils 12a-12b, intermediate foils 14a-14b, and bump foils 16a-16b defines a tab (see FIG. 4) and a free end (FIG. 4) as discussed in greater detail below. The shaft 18 is positioned inside the quad foil bearing 5 and typically rotates clockwise with respect to the view of the quad foil bearing 10. The quad foil bearing 5 and shaft 18 are received within a journal sleeve 22 formed as a unitary body that defines outer and inner diameter surfaces 24, 26 and, in turn, is received within a bore 28 of a housing 30. The sleeve 22 is arranged about a central rotational axis "A," and O-rings 32 are used to retain the sleeve 22 positioned within the bore 28. It should be noted that the sleeve 22 can be conventionally cylindrical or shaped with any suitable profile, made of a metallic material, and shaped using known including, but not limited to, milling, turning, and grinding. It should be noted also that the O-rings 32 can be of a conventional type known for use with hydrodynamic fluid film journal bearings.

The foils 12a-12b, 14a-14b, and 16a-16b are arranged inside the sleeve 22. According to an embodiment, the top foils 12a-12b, intermediate foils 14a-14b, and bump foils 16a-16b each comprise of a thin sheet of material (e.g., nickel-based alloys or steel) wrapped or rolled in a generally cylindrical shape and positioned in a bore of the sleeve 22. The bump foils 16a-16b are corrugated, allowing a working or cooling fluid such as, for example, to flow through spaces formed between adjacent corrugations. The bump foils 16a-16b are also positioned adjacent to the inner diameter surface 26 of the sleeve 12 and defines a respective bent end 34a-34b that can be angled at approximately 90° with respect to an adjacent, generally cylindrical portion of a respective bump foil 16a-16b.

Figure 1A:
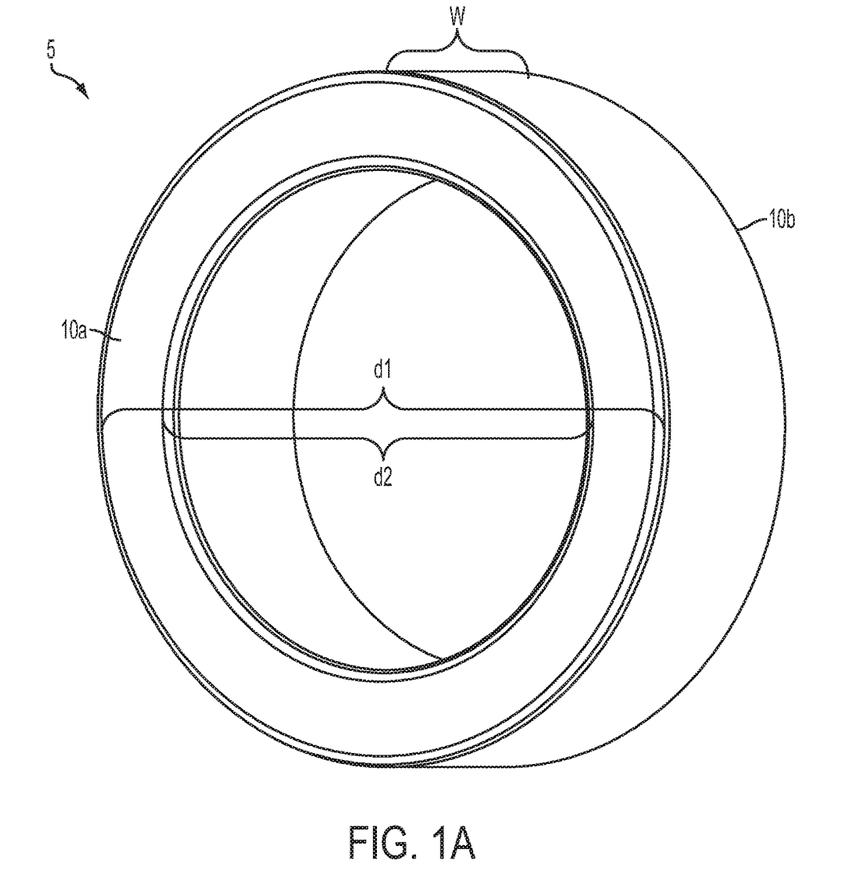
FIG. 1A a perspective view of a quad foil journal air bearing according to a non-limiting embodiment of the invention.
Figure 1B:
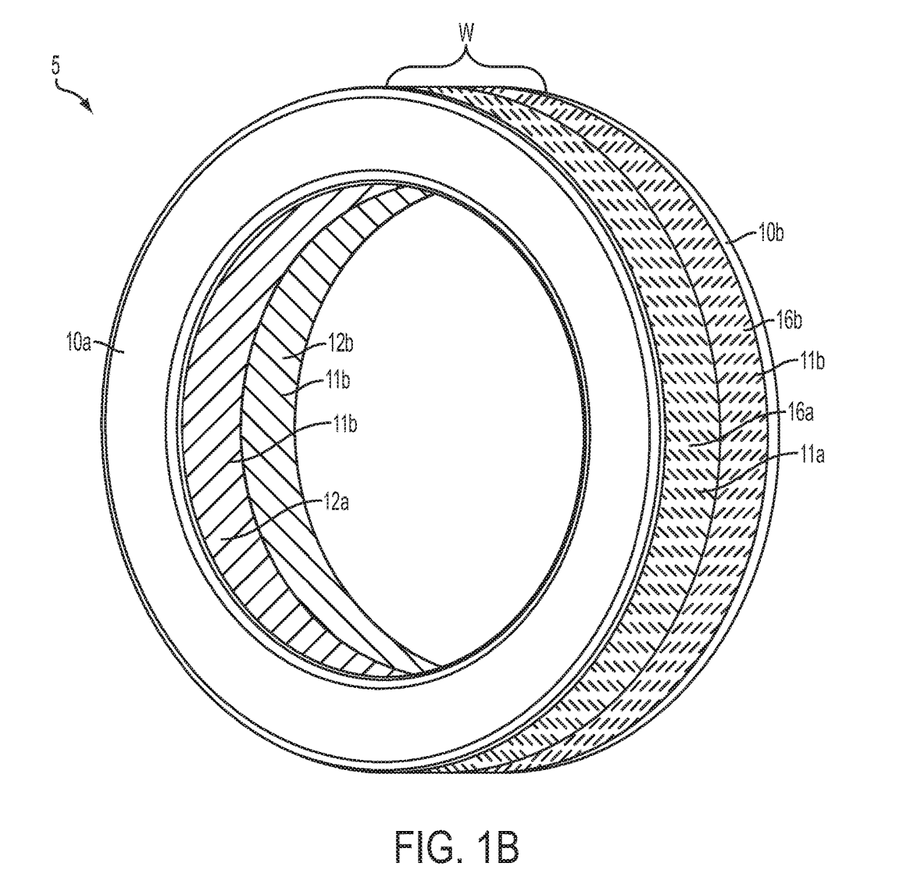
FIG. 1B is a partial cut-away view showing a first foil assembly and a second foil assembly included in the quad foil journal air bearing of FIG. 1.
Figure 2A:
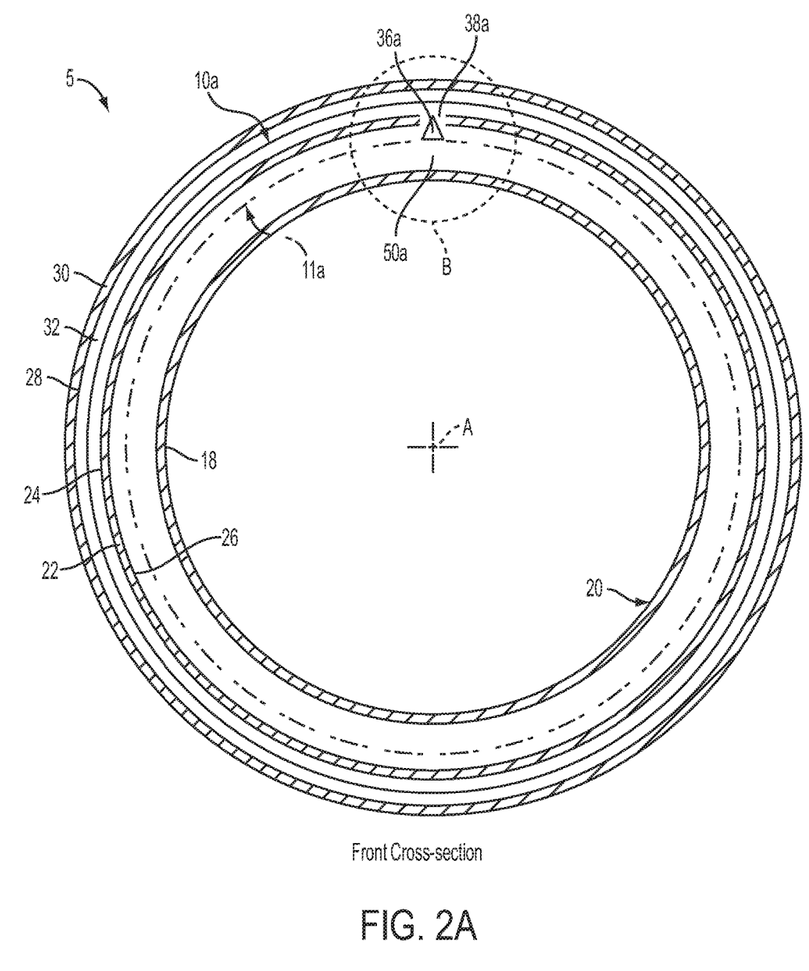
FIG. 2A illustrates a front view of the quad foil journal air bearing according to a non-limiting embodiment of the invention.
Figure 2B:
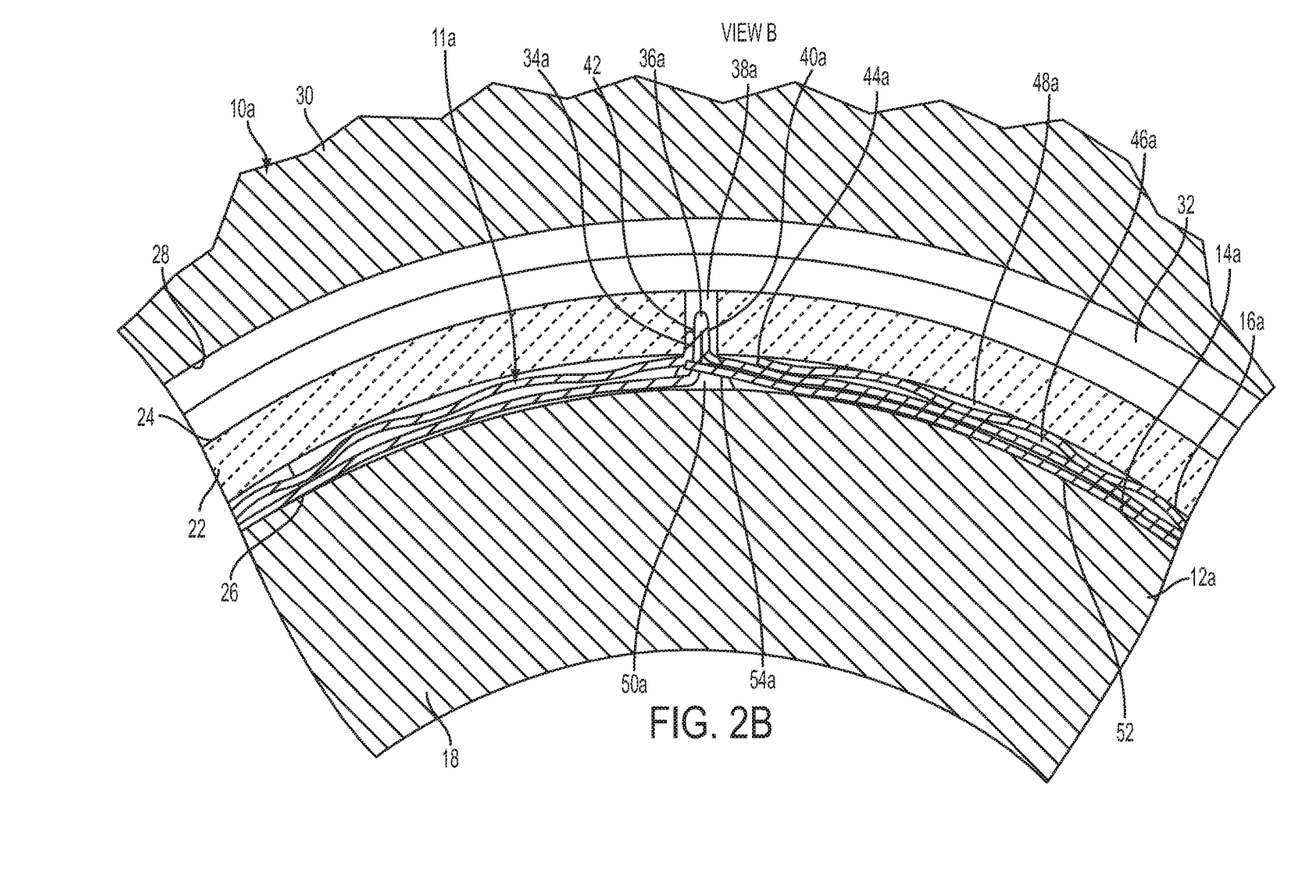
FIG. 2B is first close-up view showing a first portion of the quad foil journal air bearing according to a non-limiting embodiment.
Figure 3A:
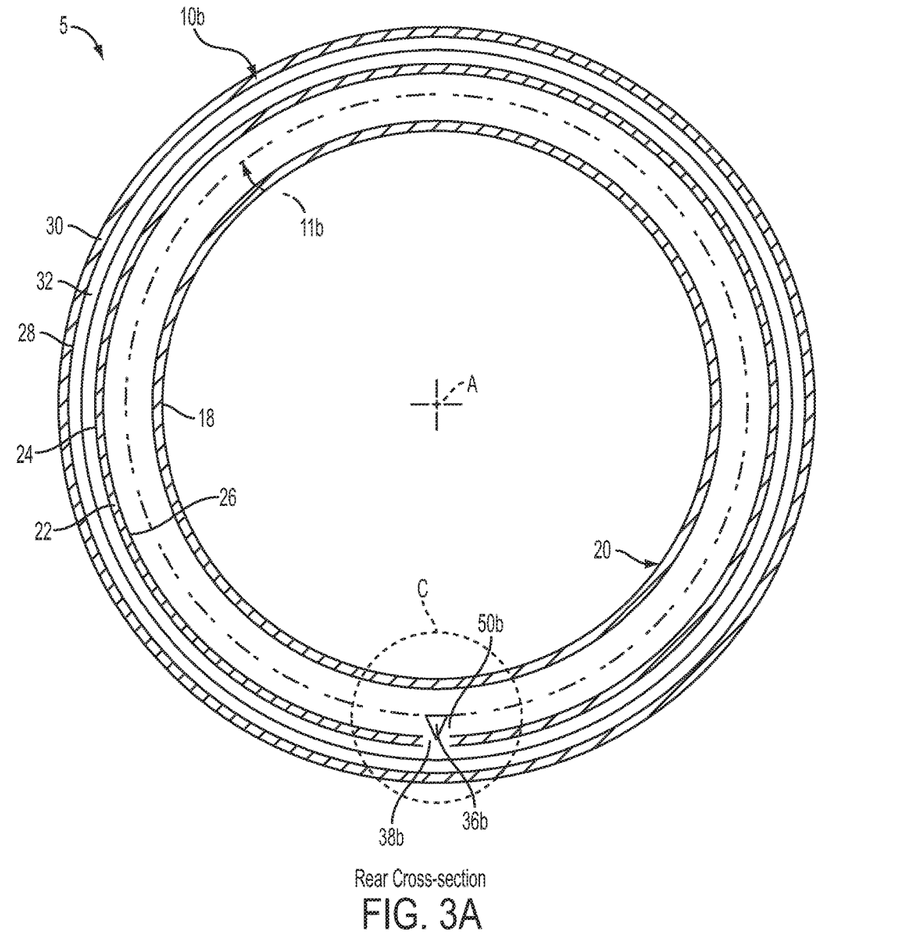
FIG. 3A illustrates a rear view of the quad foil journal air bearing according to a non-limiting embodiment of the invention.
Figure 3B:
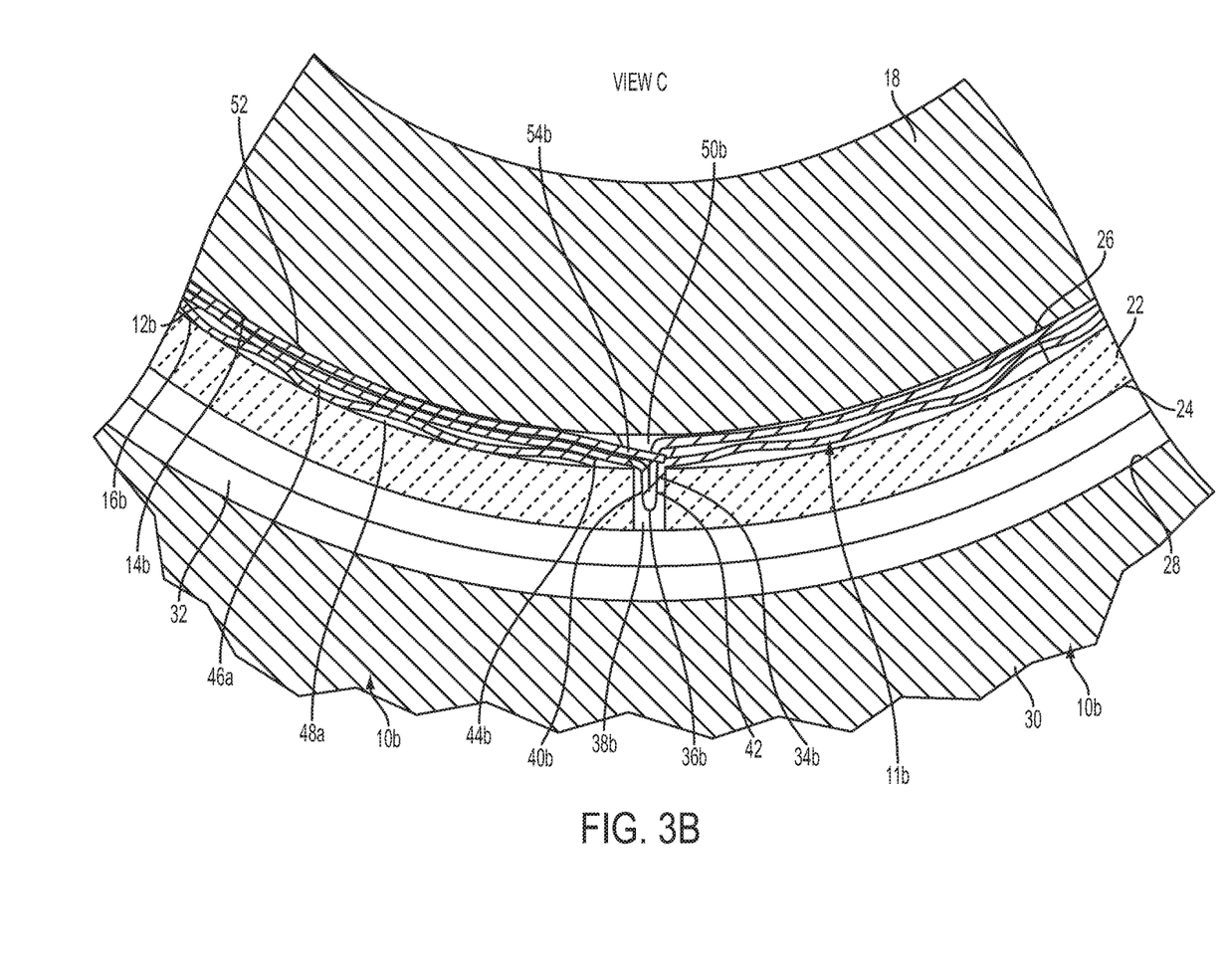
FIG. 3B is a second close-up view showing a second portion of the quad foil journal air bearing opposite the first portion according to a non-limiting embodiment.

The first foil assembly 11a includes a first key 36a that engages a first key slot 38a (see FIG. 2), and the second foil assembly 11b includes a second key 36b that engages a second key slot 38b (see FIG. 3B). Each key 36a-36b extends radially relative to the shaft 18 and is received within a respective key slot (or keyway) 38a-38b defined within the sleeve 22. According to an embodiment, the key slots 38a-38b extend entirely through a wall defined between the outer and inner diameter surfaces 24, 26 of the sleeve 22. According to another embodiment, the key slots 38a-38b are formed as partial slots machined from the inside diameter that do not extend through the outside diameter.

The key slots 38a-38b may have an elongated and rectangular shape, and arranged generally parallel to the axis "A." Each slot 38a-38b also defines a first end that is spaced from a first end of the sleeve 22 a distance and second end that is spaced from a second end of the sleeve 22 a distance. In a version of the embodiment, one distance is greater than the other such that the slots 38a-38b are axially (or longitudinally) offset with respect to a length of the sleeve 22. The slots 38a-38b can be offset in this manner for fool-proofing purposes during assembly of the quad foil bearing 10. In another version, the slots 38a-38b can be axially centered relative to the sleeve 22. The bent end 34a-34b of each respective bump foil 16a-16b extends radially outward to engage a respective slot 38a-38b and retain the bump foils 16a-16b relative to the sleeve 22. When the shaft 18 rotates, each key 36a-36b contacts edges defined by a respective slot 38a-38b, which prevents the quad foil bearing 5 from rotating with the shaft 18.

When installed with respect to the shaft 18 as part of the quad foil bearing 10, the first and second foil assemblies 11a-11b are wrapped about or around the shaft 18. More specifically, the top foils 12a-12b are positioned radially outboard the shaft 18 and adjacent to and radially inboard the intermediate foils 14a-14b, respectively, and the intermediate foils 14a-14b are positioned adjacent to and radially inboard to the bump foils 16a-16b, respectively. The bump foils 16a-16b are disposed radially outboard the top foils 12a-12b and intermediate foils 14a-14b. In this manner, the bump foils 16a-16b bias the intermediate foils 14a-14b toward the top foils 12a-12b, respectively. Accordingly, the top foils 12a-12b and the intermediate foils 14a-14b are retained at respective positions relative to the shaft 18.

The top foils 12a-12b and intermediate foils 14a-14b are joined together at a respective bent region 40a-40b that extends radially outward at least partially into a respective slot 38a-38b. The bent regions 40a-40b can be angled at approximately 90° with respect to corresponding adjacent, generally cylindrical portions of the top foils 12a-12b and the intermediate foils 14a-14b. In a version of the embodiment, the top foils 12a-12b and the intermediate foils 14a-14b are formed by opposite first portions 42a-42b and second portions 44a-44b, respectively. The opposite first portions 42a-42b and second portions 44a-44b comprises a single integral piece or sheet that join at the respective bent regions 40a-40b, which is located in a middle portion of the sheet. In another version, the top foils 12a-12b and intermediate foils 14a-14b are formed from separate sheets connected together at a respective bent region 40a-40b using welding, brazing, or other suitable attachment means.

The first key 36a joins together a first top foil 12a and a first intermediate foil 14a, while the second key 36b joins a together a second top foil 12b with a second intermediate foil 14b. The first key 36a engages the first key slot 38a and the second key 36b engages the second key slot 38b. According to a non-limiting embodiment, the first key slot 38a is located 180 degrees with respect to the second key slot 38b. Each foil assembly 11a-11b has a length to diameter aspect ratio of approximately 1 (i.e., 1 corresponding to length) to 2 (i.e., 2 corresponding to diameter), respectively. That is, the quad foil bearing 5 has two foil assemblies 11a-11b with a 1 to 2 L/D aspect ratio packaged within the same sleeve 22. In this manner, the foil assemblies 11a-11b are configured to react to axial loads imposed on along the full circumference of the quad foil bearing 10. The first and second foil assemblies 11a-11b having respective keys 36a-36b/slots 38a-38b located opposite one another cancel out stiffness asymmetries such that the uniformity of the stiffness within the quad foil bearing 5 is substantially improved. Accordingly, the quad foil bearing 5 has an increased load capacity that can withstand loads applied over a wide range of radial angles.

Air is communicated through respective channels 46a-46b defined between the intermediate foils 14a-14b the and bump foils 16a-16b, respectively, and channels 48a-48b defined between the bump foils 16a-16b and the sleeve 22, respectively. The air removes thermal energy from the quad foil bearing 10. The air is communicated also to an area defined between the top foil 12 and shaft 18 through a gap 50a-50b. More specifically, the shaft 18 rotates when the machine 20 operates. Rotation of the shaft 18 causes the air to form a cushion (often referred to as an "air bearing" or "air film") 52 that supports the shaft 18 while rotating at operating speed. In particular, the rotation causes the air to pressurize in areas between the top foil 12 and shaft 18, urging the top foils 12a-12b radially away from the shaft 18. The shaft 18 then rotates as the shaft 18 is supported by the pressurized air. There is little or no contact between the top foils 12a-12b and shaft 18 when the shaft 18 is rotating at an operational speed of the shaft 18. Due to incidental contact during regular operation of the machine 20, however, contact between the top foils 12a-12b and shaft 18 may still occur at relatively low operational speed, such as during start-up and shutdown phases.

In a version of the embodiment, the shaft 18 rotates into a wedge area on a vent side. A form radius of the foils 12a-12b, 14a-14b and 16a-16b is, for example, about 0.020" on the vent side, which is less than or approximately equal to half of a form radius of the foil 12a-12b, 14a-14b and 16a-16b on the opposite side, which is about 0.040". Also, the foils 12a-12b, 14a-14b and 16a-16b on the vent side is lower (near to an edge of a respective slot 38a-38b) than are the foils 12a-12b, 14a-14b, and 16a-16b on the opposite side. In this way, the hydrodynamic air film 52 is generated.

In a version or versions of the embodiment, there are no coatings (described in detail below) formed on the intermediate foils 14a-14b. In another version, a radially inner surface of the top foils 12a-12b exposed to the shaft 18 is coated with a suitable dry film lubricant. Use of such lubricant can reduce friction caused by the shaft 18 when the shaft 18 is accelerating to operating speed, decelerating from the operating speed, stopped, and/or subject to incidental contact with the top foils 12a-12b during regular operation of the machine 20.

According to various non-limiting embodiments described above, the dual double-wrapped foil assemblies 11a-11b provide a symmetrical stiffness within the quad foil bearing 10. Another way to improve the capacity of the quad foil bearing 5 is to increase stiffness of the top foils 12a-12b such that deformation of the top foils 12a-12b are reduced relative to thickness of the air film 52. Otherwise, the deformation, which can be approximately equal to the thickness of the air film 52 for example, allows peak pressure of the air film 52 to vent down valleys defined between respective adjacent lines of contact of the bump foils 16a-16b, which limits capacity of the quad foil bearing 10. According to a non-limiting embodiment, thickness of the top foils 12a-12b are about 0.003" to about 0.004", and pitch of the bump foils 16a-16b are about 0.186" to about 0.125", greatly reducing the deformation.

Another way to improve the capacity of the quad foil bearing 5 is to reduce finish for a coating or surface of the top foils 12a-12b. At loads approaching capacity, the thickness of the air film 52 is on the order of roughness of the surface. By reducing an allowable maximum of the surface finish, variation of the surface, which can disrupt the air film 52, is reduced and, in turn, the capacity of the quad foil bearing 5 is increased. In a version of the embodiment, the allowable maximum of the surface finish of the top foils 12a-12b are about 12 Ra, and the surface finish of the shaft 18 is about 4 Ra.

Another way to improve the capacity of the quad foil bearing 5 is to reduce variation in thickness of the intermediate foils 14a-14b. Coating of the intermediate foils 14a-14b can be eliminated to reduce the thickness variation of the intermediate foils 14a-14b that would otherwise exist due to the coating, which would translate into "load deflection" variation. In a version of the embodiment, the coating of the intermediate foils 14a-14b is eliminated so that the total thickness variation is about 0.0008". In this manner, a coefficient of friction between the top foils 12a-12b and intermediate foils 14a-14b is increased, leading to more "Coulomb" damping and reduction of ACM sub-synchronous response of the quad foil bearing 10.

Another way to improve the capacity of the quad foil bearing 5 is to reduce pre-load of the quad foil bearing 10. Tighter (smaller) load deflections result in reduced capacity of the quad foil bearing 10. In a version of the embodiment, for an applied load of about +/−12 lbs., the allowable deflection is about 0.003" to about 0.004".

Figure 4:
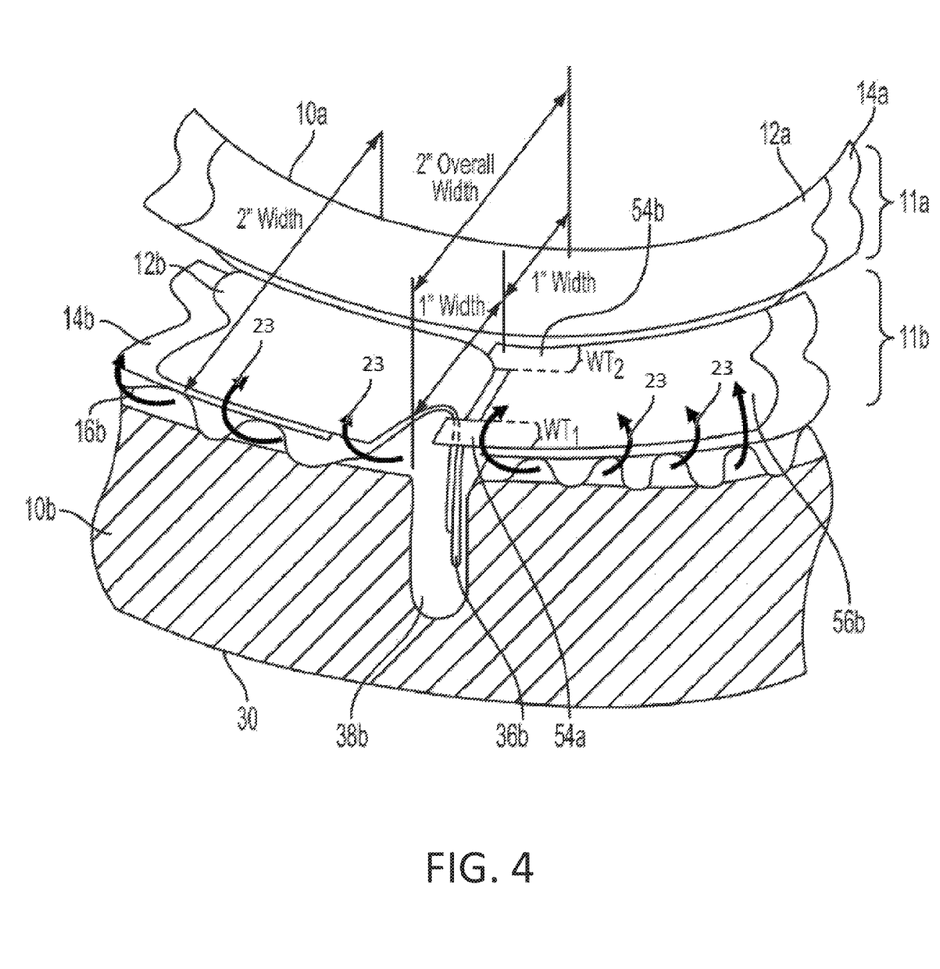
FIG. 4 is an isometric view of an arrangement between a first foil assembly with respect to a second foil assembly.

Turning now to FIG. 4, an arrangement of the second foil assembly 11b with respect to the first foil assembly 11a is illustrated according to a non-limiting embodiment. The second foil assembly 11b is shown including second key 36b disposed in the respective second key slot 38b. Accordingly, the quad foil bearing 5 is prevented from rotating with the shaft (not shown in FIG. 4). The first foil assembly 11a is aligned with the second foil assembly 11b along with the width (w) of the quad foil bearing 5.

According to a non-limiting embodiment, the width of each foil assembly 11a-11b is half the diameter (w) of the quad foil bearing 5. That is, the width of the first foil assembly 11a is w/2 and the width of the second foil assembly 11b is w/2. In this manner, the total width of the first and second assemblies is approximately the width (w) of the quad foil bearing 5. As shown in FIG. 4, for example, the quad foil bearing 5 has a width (w) of 2" (inches). Accordingly, the first foil assembly 11a and the second foil assembly 11b each have a width of 1".

The first foil assembly 11a and the second foil assembly 11b each include a pair of foil tabs 54a-54b. With reference to the second foil assembly shown in FIG. 4, the foil tabs 54a-54b are formed on the free end 56b of the top foil 12b. Although the tabs 54a-54b of the second foil assembly 11b are shown in FIG. 4, it should be appreciated that first foil assembly 11a includes foil tabs similar to the foil tabs 54a-54b included with the second foil assembly 11b.

Still referring to the second foil assembly 11b illustrated in FIG. 4, a first cutout having a first width (wt1) is formed at the end of the first key 36b and a second cutout having a second width (wt2) is formed at the opposite end of the key 36b. The first and second cutouts can have shapes that correspond to the shapes of the first and second foil tabs 54a-54b, respectively. In addition, first and second bump foil cutouts can be formed at opposite edges of the bump foil 16b. These bump foil cutouts can have shapes that correspond to those of the first and second cutouts in the top foil 12b. In this manner, the first tab 54a can engage both the outer edge of the key 36b and the first bump foil cutout, and the second tab 54b can engage both the inner edge of the key 36b and the second bump foil cutout. When the quad foil bearing 5 is fully assembled, the foil tabs 54a-54b are maintained in a "straight" configuration such that both foil tabs 54a-54b generally retain the substantially cylindrical shape of the top foil 12b. This "straight" foil tab configuration eliminates the necessity of permanently bending the foil tabs 54a-54b when fabricating and assembling the quad foil bearing 5, which can reduce the complexity of fabrication and assembly processes and thereby reduce costs.

When the foil tabs 54a-54b are inserted into the cutouts of the top foil 12b at both ends of first key 36b, skewing forces which tend to move the top foil 12b axially cause the foil tabs 54a-54b to engage the respective engagement edges of the first key 36b. In this manner, the foil tabs 54a-54b are limited from skewing movement because key 36b engages the respective key slot 38b. Engagement between the foil tabs 54a-54b within the cutouts reduces or eliminates skewing of the free end 56b of the top foil 12b, and thereby helps maintain desired operation of the quad foil bearing 5. Engagement contact between the foil tabs 54a-54b within the cutouts can occur at the bent region of the key 36b, for example, so that torque imparted to a rotatable component supported by the quad foil bearing 5 by the foil tabs 54a-54b is reduced or eliminated. It should be noted that dimensions of the cutouts, particularly in the axial direction, can be slightly larger than those of the foil tabs 54a-54b in order to allow a gap to be formed between those structures at a suitably small tolerance for assembly. Moreover, where cutouts are formed in the bump foil 16b, the foil tabs 54a-54b can further extend into the bump foil cutouts and expose the foil tabs 54a-54b to the inner diameter surface of the journal sleeve, allowing contact therebetween.

Figure 5A:
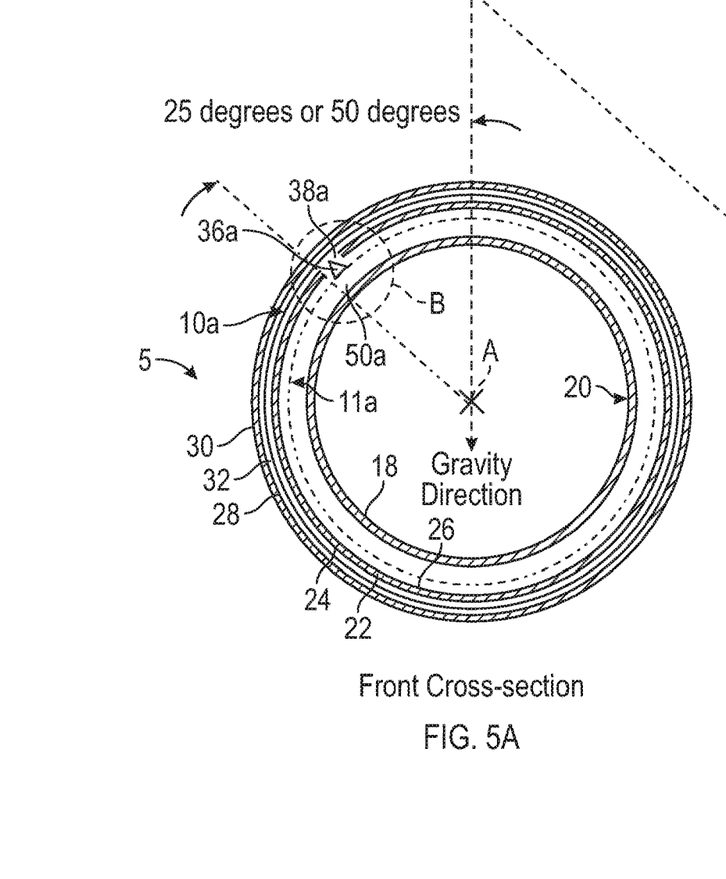
FIGS. 5A and 5B are cross-section front and rear views of the quad foil journal air bearing according to another non-limiting embodiment of the invention.
Figure 5B:
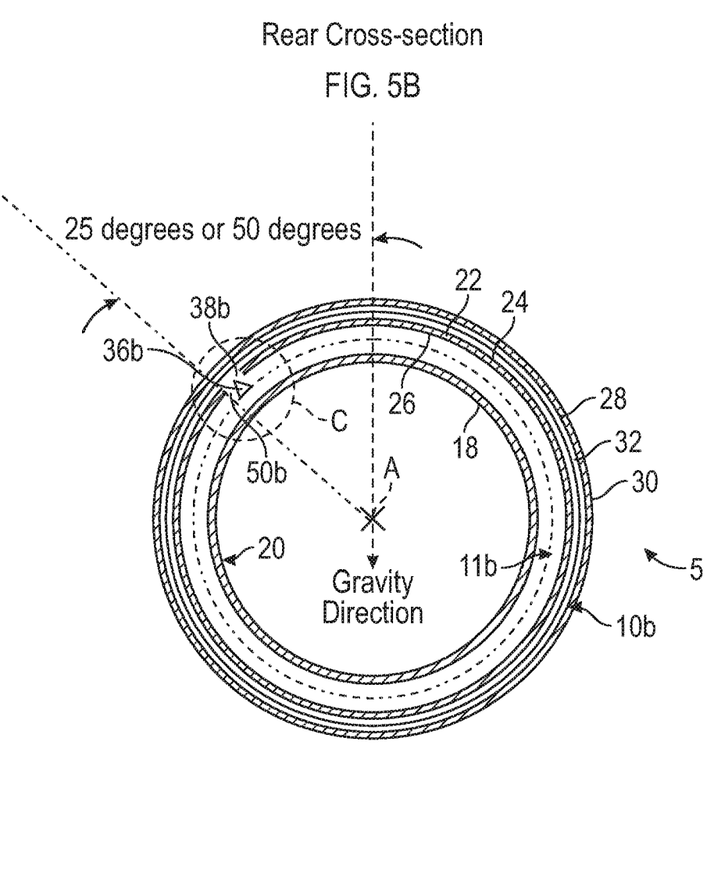

Turning now to FIGS. 5A and 5B, front and rear cross-sectional views of the quad foil journal air bearing 5 are illustrated according to another non-limiting embodiment. Unlike FIGS. 2A and 3A, which are spaced 180 degrees apart from one another, and thus are equally spaced about the circumference of the bearing 5, this embodiment provides that the first key 36a (and respective key slot 38a) and the second key 36b (and respective key slot 38b) are unequally spaced about the circumference of the quad foil journal air bearing 5.

For instance, FIG. 5A shows a first side 10a (e.g., front side 10a) of the quad foil journal air bearing 5 having the first key 36a and first key slot 38a positioned a first position in relation to the circumference of the bearing 5. In at least one embodiment, the first key 36a and first key slot 38a are positioned 25 degrees counterclockwise with respect to the gravity force direction extending through a circumference of the quad foil journal air bearing 5 (e.g., extending from the top to the bottom of the bearing 5).

FIG. 5B shows the position of the second key 36b and second key slot 38b second side 10b (e.g., rear side 10a) in relation to the circumference of the second side of the quad foil journal air bearing 5. In at least one embodiment, the second key 36b and second key slot 38b are positioned 25 degrees counterclockwise with respect to the gravity force direction extending through a circumference of the quad foil journal air bearing 5. Accordingly, the shortest angle between the first and second keys 36a and 36b (and their respective key slots 38a and 38b) is 50 degrees, while the largest angle between the first and second keys 36a and 36b is 310 degrees. Therefore, the first key 36a (and respective key slot 38a) and the second key 36b (and respective key slot 38b) are unequally spaced about the bearings circumference. In other words, if analyzing the front side of the quad foil journal air bearing 5 and setting the gravitational force as 0 degrees, the first key 36a (and first key slot 38a) located at the front side would be positioned at 335 degrees, while the second key 36b (and second key slot 38b) located on the second side would be positioned at 25 degrees. Accordingly, the distance of the first and second keys 36a and 36b about the circumference of the quad foil journal air bearing 5 is unequal.

Figure 6:
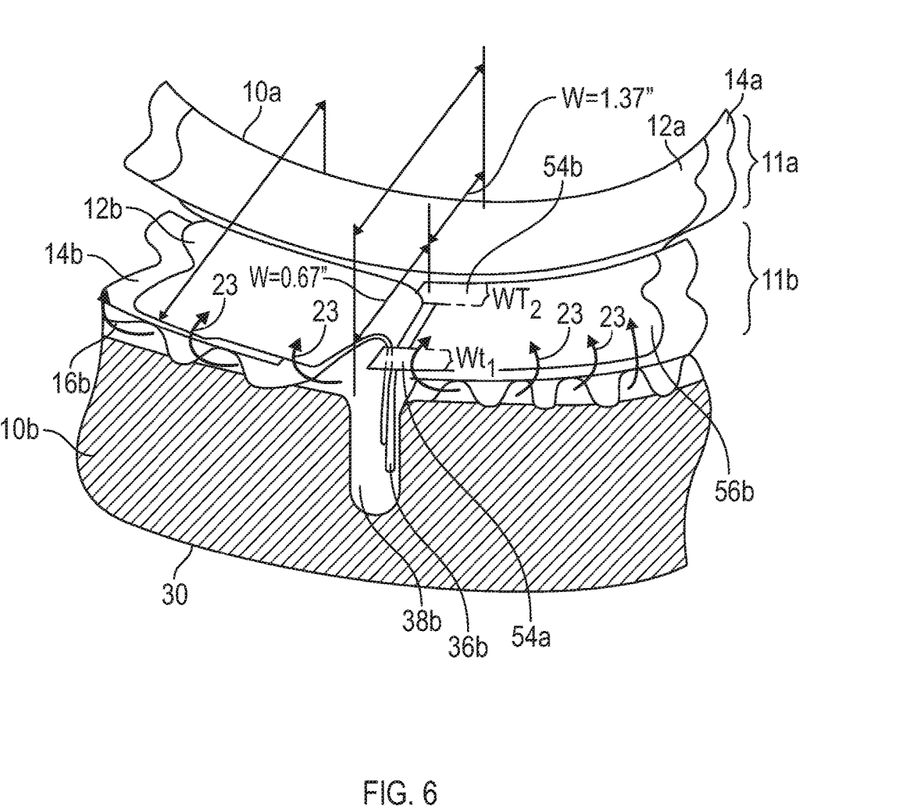
FIG. 6 is an isometric view of an arrangement between a first foil assembly with respect to a second foil assembly according to another non-limiting embodiment.

FIG. 6 is an isometric view of an arrangement between a first foil assembly 11a with respect to a second foil assembly 11b according to another non-limiting embodiment. In this embodiment, the quad foil bearing 5 can still have a total width (w) of 2" (inches). However, the width of the individual foil assemblies 11a and 11b are different from one another. For example, the width of the first outer foil assembly 11a, e.g., the outer foil assembly 11a, can be 1.37 inches while the width of the second foil assembly 11b, e.g., the inner foil assembly 11b, can be 0.67 inches.

It should be appreciated that the unequal foil assembly widths can be employed with keys that are equally spaced (e.g., arranged 180 degrees apart from one another), or with keys that are unequally spaced. For example, at least one embodiment of the invention combines the unequal key arrangements illustrated in FIGS. 5A and 5B with the unequal foil assembly widths illustrated in FIG. 6.

For instance, although the first key 36a and first key slot 38a are not illustrated in FIG. 6, it should be appreciated that the first key 36a and first key slot 38a can be located a set degrees (e.g., 50 degrees) away from the first key 36a and first key slot 38a as described above. Accordingly, the "softness" and the spring rate of the quad foil bearing 5 can be adjusted. For example, the "softness" and/or "spring rate" can be varied from the inner circumference to the outer circumference, or from a region near the shaft to a region near the outer surface of the bearing 5. Moreover, the narrower foil width (e.g., positioned at shaft outer ends) reduces effects of shaft misalignments while allowing increasing load capacity without impacting whirl effects. In addition, the stiffness of the bearing can be adjusted without changing the pitch of the bump foils, which doing so would compromise the support provided by the bump foil.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A quad foil journal air bearing comprising:
a journal sleeve that defines an inner surface contacting a dual double-wrapped foil assembly, the dual double-wrapped foil assembly consisting of a first foil assembly including a first key and a second foil assembly including a second key, the inner surface extending between a front side of the quad foil journal air bearing and a rear side of the quad foil journal air bearing located opposite the front side;
the first key being coupled to the inner surface of the journal sleeve; and
the second key being coupled to the inner surface of the journal sleeve,
wherein the first key and the second key are unequally spaced apart about a circumference of the quad foil journal air bearing,
wherein the first key is positioned at a location of the front side of the quad foil journal air bearing, the location of the front side being a first measure of degrees that is counterclockwise with respect to the gravity force direction extending through a circumference of the quad foil journal air bearing, and
wherein the second key is positioned at a location of the rear side of the quad foil journal air bearing, the location of the rear side being a second measure of degrees that is counterclockwise with respect to the gravity force direction extending through a circumference of the quad foil journal air bearing.

2. The quad foil journal air bearing of claim 1, wherein the first key is coupled to a first portion of the inner surface and the second key is coupled to a second portion of the inner surface different from the first portion.

3. The quad foil journal air bearing of claim 2, wherein the journal sleeve further includes a first key slot formed in the first portion of the inner surface and a second key slot formed in the second portion of the inner surface, the first key slot offset with respect to the second key slot.

4. The quad foil journal air bearing of claim 3, wherein the first key extends radially from the first foil assembly and engages the first key slot and the second key extends radially from the second foil assembly and engages the second key slot such that the first key is offset with respect to the second key.

5. The quad foil journal air bearing of claim 4, wherein the first key is offset with respect to a center of gravity extending through the circumference of the quad foil journal air bearing, and the second key is offset with respect to the center of gravity extending through the circumference of the quad foil journal air bearing.

6. The quad foil journal air bearing of claim 5, wherein the first foil assembly and the second foil assembly each have a length to diameter aspect ratio of approximately 1 to 2, respectively.

7. The quad foil journal air bearing of claim 6, wherein the first foil assembly and the second foil assembly each comprise:
   a top foil;
   an intermediate foil joined to the top foil, and disposed radially outboard the top foil; and
   a bump foil disposed radially inboard the journal sleeve and configured to provide a path for communicating a fluid from between the top and intermediate foils and the intermediate and bump foils.

8. A rotating component, comprising:
   a rotatable shaft; and
   a quad foil journal air bearing configured to rotate the shaft, the quad foil journal air bearing including:
      a journal sleeve that defines an inner surface contacting a dual double-wrapped foil assembly, the dual double-wrapped foil assembly consisting of a first foil assembly including a first key and a second foil assembly including a second key, the inner surface extending between a front side of the quad foil journal air bearing and a rear side of the quad foil journal air bearing located opposite the front side, the journal sleeve disposed adjacent an outer surface of the shaft to define a foil chamber therebetween;
      the first key disposed in the foil chamber and being coupled to the inner surface of the journal sleeve; and
      the second key disposed in the foil chamber and being coupled to the inner surface of the journal sleeve,
      wherein the first key and the second key are unequally spaced apart about a circumference of the quad foil journal air bearing,
      wherein the first key is positioned at a location of the front side of the quad foil journal air bearing, the location of the front side being a first measure of degrees that is counterclockwise with respect to the gravity force direction extending through a circumference of the quad foil journal air bearing, and
      wherein the second key is positioned at a location of the rear side of the quad foil journal air bearing, the location of the rear side being a second measure of degrees that is counterclockwise with respect to the gravity force direction extending through a circumference of the quad foil journal air bearing.

9. The rotating component of claim 8, wherein the first key is coupled to a first portion of the inner surface and the second key is coupled to a second portion of the inner surface different from the first portion.

10. The rotating component of claim 9, wherein the journal sleeve further includes a first key slot formed in the first portion of the inner surface and a second key slot formed in the second portion of the inner surface, the first key slot offset with respect to the second key slot.

11. The rotating component of claim 10, wherein the first key extends radially from the first foil assembly and engages the first key slot and the second key extends radially from the second foil assembly and engages the second key slot such that the first key is offset with respect to the second key.

12. The rotating component of claim 11, wherein the first key is offset with respect to a center of gravity extending through a circumference of the quad foil journal air bearing, and the second key is offset with respect to the center of gravity extending through the circumference of the quad foil journal air bearing.

13. The rotating component of claim 12, wherein the first foil assembly and the second foil assembly each have a length to diameter aspect ratio of approximately 1 to 2, respectively.

14. The rotating component of claim 13, wherein the first and second foil assemblies each comprise:
   a top foil configured to receive the shaft;
   an intermediate foil disposed radially outboard the top foil; and
   a bump foil disposed radially inboard the journal sleeve and adapted to bias at least a portion of the top foil against the outer surface of the shaft and provide a path for communicating the fluid from between the top and intermediate foils and the intermediate and bump foils.

15. The rotating component of claim 14, wherein the top foil is joined to the intermediate foil.

* * * * *